United States Patent [19]
Taddeo et al.

[11] Patent Number: 5,142,216
[45] Date of Patent: Aug. 25, 1992

[54] COMPENSATING ARRANGEMENT FOR A LOAD VOLTAGE, SYNCHRONOUSLY DISTURBED BY A DISTRIBUTION SYSTEM OR THE LIKE

[76] Inventors: Fausto V. Taddeo, 15122 Bolsa Chica St.; Mark A. Woodward, 5341 Meadowlark Dr., both of Huntington Beach, Calif. 92649

[21] Appl. No.: 577,089

[22] Filed: Aug. 29, 1990

Related U.S. Application Data

[63] Continuation of Ser. No. 449,236, Dec. 7, 1989, abandoned, which is a continuation of Ser. No. 149,705, Jan. 29, 1988, abandoned.

[51] Int. Cl.⁵ .............................................. G05F 1/10
[52] U.S. Cl. .................................. 323/234; 323/266; 363/26
[58] Field of Search ............... 323/213, 234, 266, 274, 323/280

[56] References Cited

U.S. PATENT DOCUMENTS

| | | | |
|---|---|---|---|
| 3,602,802 | 8/1971 | Chan | 323/234 |
| 4,251,857 | 2/1981 | Shelly | 363/26 |
| 4,293,904 | 10/1981 | Brooks et al. | 323/266 X |
| 4,551,668 | 11/1985 | Kammiller | 323/234 |
| 4,603,288 | 7/1986 | Rogers | 323/234 |

FOREIGN PATENT DOCUMENTS 0002016  1/1981  Japan .................................. 323/234

Primary Examiner—Steven L. Stephan
Assistant Examiner—Kristine Peckman
Attorney, Agent, or Firm—Harness, Dickey & Pierce

[57] ABSTRACT

In a compensating arrangement for a disturbed load voltage ($V_2$, FIG. 3) of a remotely located load (20), the load voltage is fed back and combined with the voltage ($E_{osc}$) of an oscillator (10A) to form an error signal ($E_X$). The error signal is stored for a period less than one cycle of $E_{osc}$ by a selected period (T) and combined with the oscillator voltage ($E_{osc}$) to be amplified and produce a modified output voltage ($V_O$). The latter, when fed to the load through a distribution system (15) results in the waveform of the load voltage ($V_L$) being substantially identical to that of the oscillator voltage ($E_{osc}$).

11 Claims, 4 Drawing Sheets

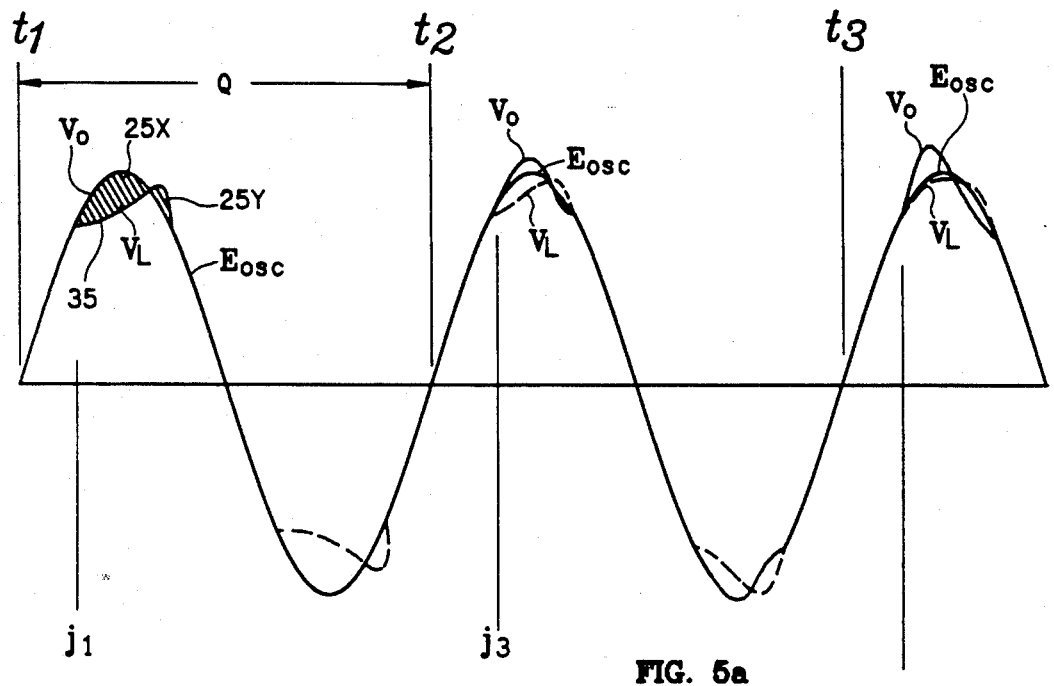
FIG. 5a
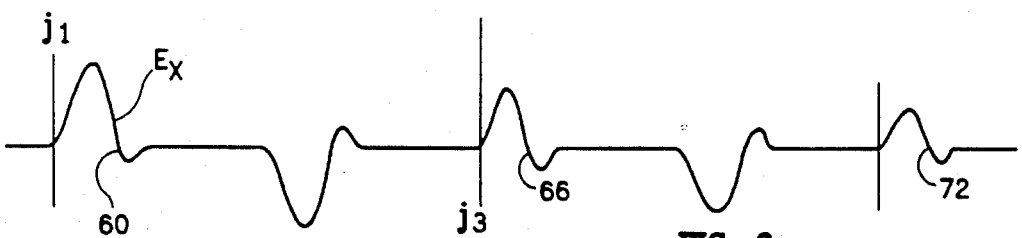
FIG. 6a
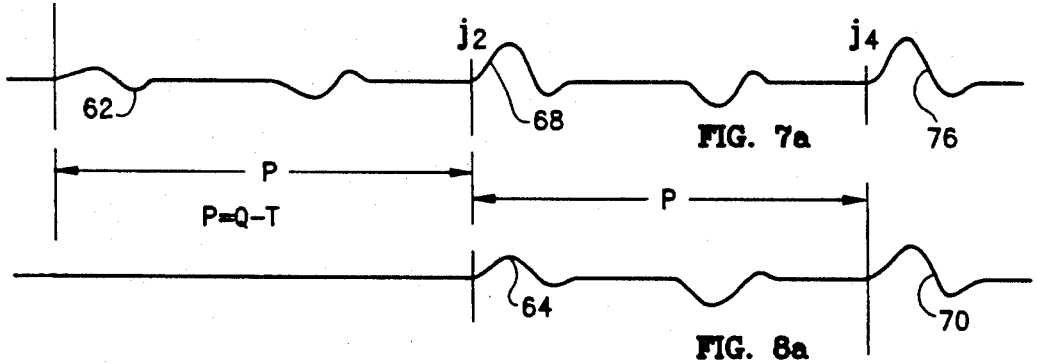
FIG. 7a
FIG. 8a

COMPENSATING ARRANGEMENT FOR A LOAD VOLTAGE, SYNCHRONOUSLY DISTURBED BY A DISTRIBUTION SYSTEM OR THE LIKE

This is a continuation of Ser. No. 07/449,236 filed on Dec. 7, 1989, now abandoned, which is a continuation of Ser. No. 07/149,705 filed on Jan. 29, 1988, now abandoned.

1. Field of the Invention

The present invention generally relates to electrical signal waveform fidelity and, more particularly, to an arrangement for controlling and maintaining the fidelity of the waveform of a voltage at a load in the presence of inductive and/or distribution losses, both real and reactive.

2. Description of the Prior Art

There are many instances in which it is important to maintain the fidelity of the wave shape of a voltage which is applied to a load from an appropriate power source. For example, if the load itself is an unregulated full wave rectifier power supply, current is pulled only at the peaks of the sine wave. When the power supply is actually fed from a remotely located power source, due to the output inductance of the power source and/or other losses, both real and reactive through the distribution system between the power source and power supply, the voltage wave shape or waveform at the power supply, i.e., the load is disturbed. Typically, the peak of the waveform which is typically a sine wave flattens out. Thus, the load voltage differs from the power supply output voltage. This is most undesirable for high reliability performance.

The distortion of the waveform of the voltage at the load, which may occur, not necessarily at the peaks, but at various portions of the cycle, is undesirable in multiphase systems where phase measurements need to be taken. Herebefore these problems were not solved satisfactorily. One typical prior art technique employs measurements of the RMS value at the load and adjusting it up or down. However, this technique is unsatisfactory since changing the RMS values alters the amplitude of the load voltage over the entire cycle, rather than correcting the load voltage only in the portions of the cycle where disturbances occur, such as peak disturbances. Correcting the cycle only where disturbances occur is most desirable and necessary for accurate phase measurements.

Theoretically, the load voltage may be fed back to the power source to form a closed loop for gain purposes in order to correct the load voltage distortion. However, as should be appreciated by those familiar with the art, one cannot close a loop around resonance-producing devices such as the inductors or other active elements which are always present in any real distribution system. Attempting to close a loop around such devices would result in unacceptable oscillatory conditions.

A need thus exists for an adequate arrangement to maintain the fidelity of the waveform of a voltage at a load which is remotely located from a power source and connected through a distribution system with the fidelity being maintained with real time resolution.

SUMMARY OF THE INVENTION

In accordance with the present invention, means are provided which anticipate the load voltage disturbing event which appears synchronously, i.e., every cycle, and which apply a compensation in the form of an error signal to the power source. The error signal is applied to the next event, to cause the output voltage of the power source to be modified, so that as this output voltage is fed and supplied to the load through a distribution system, in spite of the event, the fidelity of the load voltage is maintained.

The novel features of the present invention are set forth with particularity in the appended claims. The invention will best be understood from the following description when read in conjunction with the accompanying drawings.

BRIEF DESCRIPTION OF THE DRAWINGS

FIGS. 5a and 5b, 6a and 6b, 7a and 7b and 8a and 8b are waveform diagrams of various signals useful in explaining the operation of the invention during several cycles.

DESCRIPTION OF THE PREFERRED EMBODIMENTS

Figure 1:
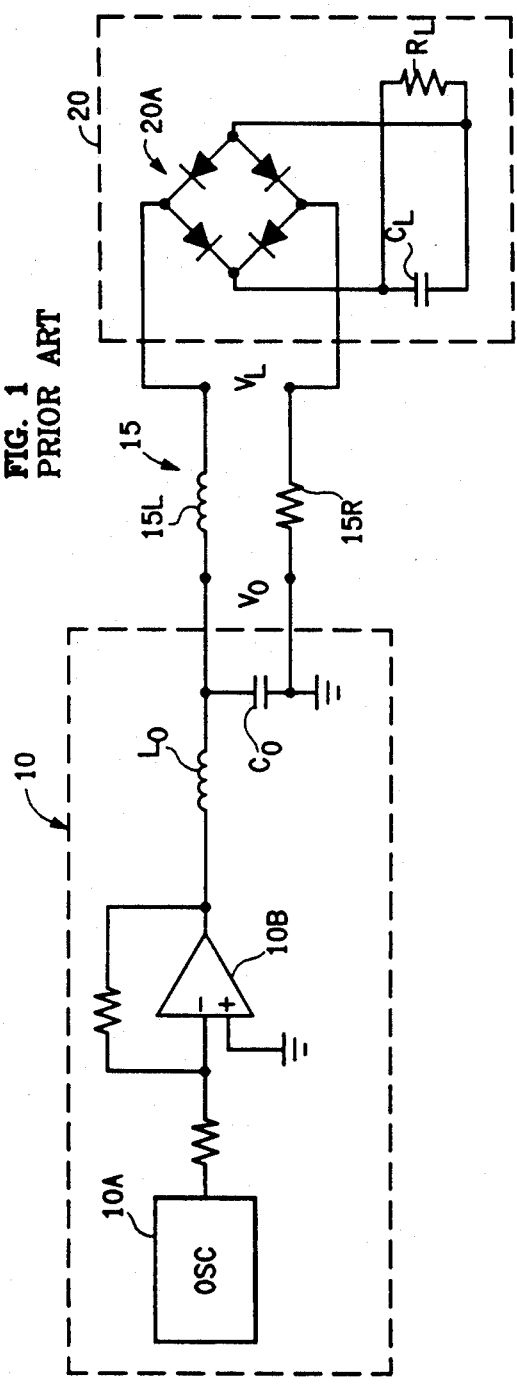
FIGS. 1 and 2 are block and waveform diagrams, respectively, useful in explaining the prior art.

Attention is first directed to FIG. 1 wherein numeral 10 designates a power source, with an output voltage $V_O$. Numeral 20 designates a remotely located load, which is connected to power source 10 through a distribution network 15. The latter is assumed to cause distribution losses, both inductive due to inductance 15L and resistive losses due to resistance 15R. The voltage at the load 20 is designated by $V_L$.

In FIG. 1, the load is assumed to be a full wave rectifier power supply 20A, with its output capacitor $C_L$. Power supply 20A is assumed to provide power to a load, such as a computer or the like, represented by $R_L$. The power source 10 is shown comprising an oscillator 10A, which is assumed to provide an output with a precise waveform, hereafter generally assumed to be a sine wave. It is the output of the oscillator which is amplified by amplifier 10B. The amplified sine wave is then fed to network 15 through inductor $L_O$ across output capacitor $C_O$.

Figure 2:
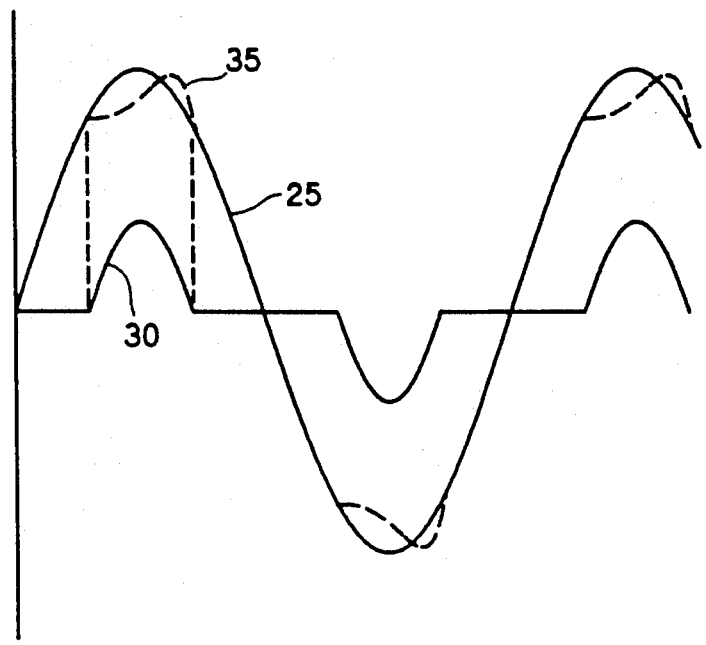

Attention is now directed to FIG. 2. Therein, numeral 25 designates $V_O$. When load 20, which is non-linear in that current, designated by 30 flows only during the peaks of the sine wave, when the rectifiers are forward biased, due to the losses caused by the distribution network and the resonance, created by $C_L$ and $L_O$ the sine wave, at the load, i.e., $V_L$ is distorted. The distortion is represented in that the peak of the sine wave is somewhat compressed and reduced in amplitude. This is represented in FIG. 2 by dashed line 35. Thus, whereas $V_O$, out of power source 10, is an accurate and precise sine wave, the wave shape of $V_L$ is distorted. Clearly, depending on other types of loads, the distortion may occur at other points in the cycle, rather than at the peaks. As previously pointed out, in the prior art, no means are provided to compensate the output of the power source 10 so that in spite of the losses, created by the, distribution system network and by any resonance, the waveform across the load, i.e., $V_L$ is maintained to be substantially a perfect sine wave.

Figure 3:
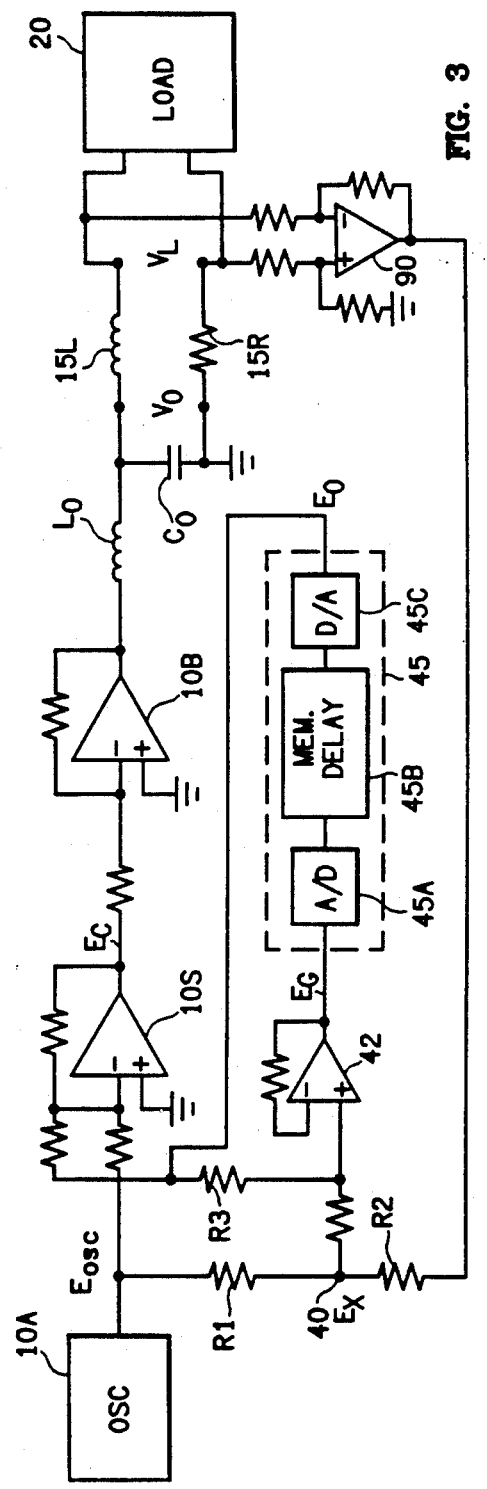
FIG. 3 is a block diagram of one embodiment of the invention.
Figure 4:
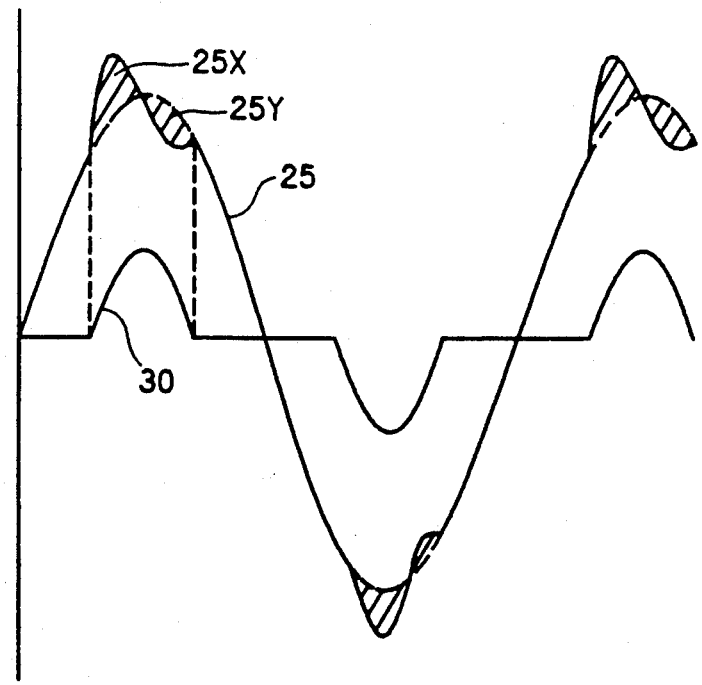
FIG. 4 is a waveform diagram useful in highlighting the advantage of the present invention.

This problem is solved by the present invention, a solution which may best be explained in connection with FIGS. 3 and 4 to which reference is now made. FIG. 3 is a block diagram of the novel circuitry of the present invention, and FIG. 4 is a waveform diagram useful in explaining the invention. Basically in accordance with the present invention, the load voltage $V_L$ across the load is monitored and fed back to power source 10. It is continuously compared with the perfect sine wave waveform of oscillator 10A. Any distortion in $V_L$ results in an error signal. This error signal is then used less than one full cycle thereafter by a duration which will be explained later when the synchronous disturbance is expected to occur to modify the output $V_O$ of source 10. Briefly, it is used to over-compensate $V_O$, so that as $V_O$ is passed through the distribution system and supplied to the load 20, the waveform of $V_L$ appears to have a substantially perfect sine wave shape. As shown in FIG. 4, the output $V_O$ is modified, as designated by areas 25X and 25Y so that $V_L$ is close to a perfect sine wave.

A simplified diagram of the circuitry, necessary to practice the invention is shown in FIG. 3, with sufficient detail to enable those familiar with the art to practice the invention. As shown, both $V_L$ and the output $E_{osc}$ of oscillator 10A, which is assumed to provide a perfect sine wave output, are fed to a node 40 through resistors R1 and R2. These resistors are appropriately scaled to account for any gain so that a voltage $E_X$ is produced at node 40, which is the difference between $V_L$ and $E_{osc}$. In the absence of any distortion in $V_L$, with respect to $V_O$, which is essentially the output of the oscillator, amplified by amplifier 10B, $E_X$ is zero. However, in the presence of distortion of the load voltage $V_L$, the error signal $E_X$ is other than zero, representing a distortion produced error signal. It is this error signal which is fed to a summing amplifier 42, whose output is designated $E_G$.

The latter is fed to a sample and store unit 45. Basically during each cycle of the output of oscillator 10A, unit 45 samples a preselected number of samples of $E_G$, e.g. 1,024, and stores them for a period P which is less by a selected time interval T than one full cycle. The value of T to be chosen will be discussed hereafter. The output of unit 45 is represented by $E_D$ and is essentially equal to $E_G$ sampled and stored in unit 45, P units of time earlier. $E_D$ is fed to summing amplifier 42 and summed up with the instantaneously arriving error signal $E_X$. A portion of $E_D$ is also fed to a summer 10S. Therein it is added to the output $E_{osc}$ of oscillator 10A, to form a signal $E_C$ which is then amplified by amplifier 10B to form $V_O$.

It should thus be clear that in the prior art, $V_O$ is the amplified output of oscillator $E_{osc}$, which has a perfect sine wave. Thus, the output voltage $V_O$ also has a perfect sine wave. However, as it is fed to the load through the distribution network 15, the load voltage $V_L$ becomes distorted. However, in the present invention, $V_O$ is amplified $E_C$. The latter is not a perfect sine wave as represented by the output of the oscillator 10A. Rather, $E_C$ is the summation of $E_{osc}$ and $E_D$, the latter being a function of the distortion of $V_L$. Consequently, when $E_C$ is amplified, it results in the output voltage $V_O$, which is compensated in a way so that when it is fed through the distribution network 15 and appears across the load 20, when the next disturbing even occurs, $V_L$ appears to have a substantially perfect sine wave, as shown by 25Y in FIG. 4. Alternately stated, the oscillator output $E_{osc}$ is modified so that when the load event occurs in the next cycle, $V_O$ has a wave shape so that in spite of the load event, $V_L$ appears to have a substantially perfect sine waveform.

It should be clear that unit 45 can be implemented in various different ways. As shown in FIG. 3, it comprises an analog to digital (A/D) circuit 45A. The digital output is stored as a plurality of successive samples in memory delay 45B. The latter may consist of an 8-bit delay line with a delay of P, where P is equal to one cycle Q of the output of oscillator 10A minus the period designated T. That is $P=Q-T$. At the end of this delay period, each sample is retrieved from circuit 45B and is converted back to an analog signal by the digital-to-analog (D/A) converter 45C to form the signal $E_D$.

It should be pointed out that the correction is one of employing a successive approximation technique rather than attempting to make all the correction in one cycle. It should further be pointed out that without the invention $V_L$ is distorted both in time, i.e., a phase shift delay and in an amplitude. In accordance with the present invention, only a portion of $E_D$ is summed with the oscillator output $E_{osc}$ so that the amplitude correction of $V_L$ across the load is gradual. Also, the time interval T, i.e., the time by less than one cycle that $E_G$ is delayed in unit 45B is less than the total system delay, caused by distribution network 15 and the resonance created by $L_O$ and $C_L$. Defining the total system delay by Z, T is always less than Z. Preferably, T is one-fifth to one-tenth of the system delay Z.

Figure 5B:
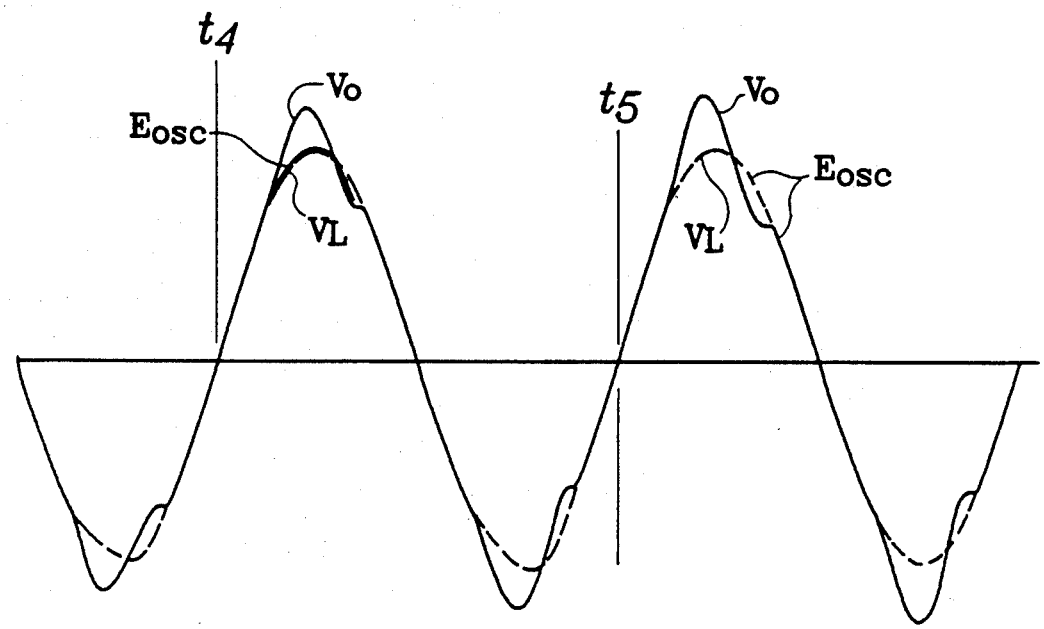

Although the following description is fully adequate to enable those familiar with the art to practice the invention, the operation of the circuitry, shown in FIG. 3, may further be highlighted by describing its operation during several cycles of operation in connection with a specific example. In this example, it is assumed that $E_{osc}$ provides a sine wave and that the load draws current only at the peaks of $V_L$, and thus $V_L$ is peak sensitive. FIGS. 5a and 5b diagram $E_{osc}$, $V_O$ and $V_L$, wherein the gain provided by 10B is assumed to be one, and thus initially $V_O$ is the same in phase and amplitude as $E_{osc}$. The starts of the five cycles of the operation are designated by t1, t2, t3, t4 and t5. The cycle period is Q. The distortion of $V_L$ is designated by 35 (as in FIG. 2).

Figure 6B:
Figure 7B:
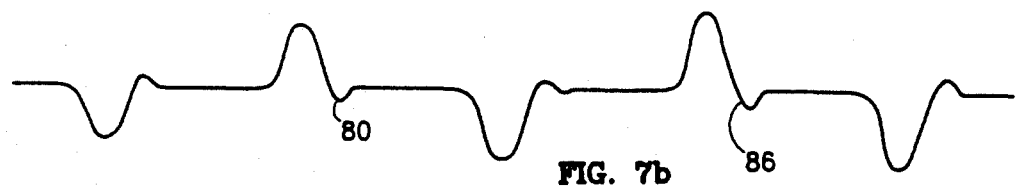
Figure 8B:
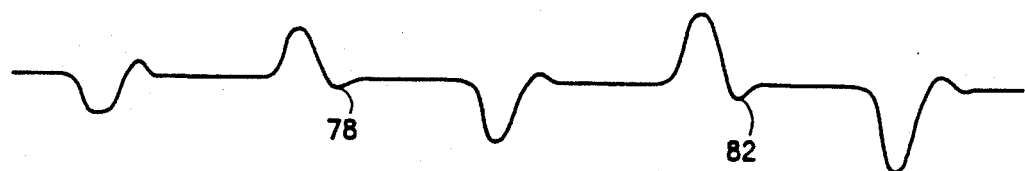

FIGS. 6a and 6b diagram the error signal $E_X$ at node 40, which, as herebefore explained, is the error between $V_L$ and $E_{osc}$, i.e. the error in the shape and time of $V_L$ with respect to $E_{osc}$. The signal $E_G$ is diagrammed in FIGS. 7a and 7b, and $E_D$ is diagrammed in FIGS. 8a and 8b. As herebefore explained, $E_D$ is identical to $E_G$ during the previous cycle and is delayed with respect to $E_G$ by the period P, where $P=Q-T$, T being a selected portion of the delay experienced by $V_L$ due to the distribution network 15 and the resonance of any devices such as $L_O$ and $C_L$ (see FIGS. 1 and 3).

During the first cycle, $E_D$ is assumed to be zero. Assuming that the disturbance of $V_L$ starts at time j1, $E_X$ is generated. It is designated by numeral 60. A portion thereof is added by summer 42 to $E_D$ which, in the first cycle, is zero in order to form $E_G$, which is designated by numeral 62. $E_G$ is stored in unit 45 for the period P and is then read out at time j2 as $E_D$, which is designated by numeral 64.

As $E_D$ is read out, a scaled portion thereof is fed to circuit 10S (see FIG. 3) which adds scale $E_D$ to $E_{osc}$. Thus, $V_O$ is no longer identical in waveform to $E_{osc}$. Rather, $V_O$ is somewhat modified, as indicated in the second cycle in FIG. 5a by areas 25X and 25Y. Consequently, the deviation between $V_L$ and $E_{osc}$ is reduced. At time j3, $E_X$ is again formed, as designated by numeral 66. In summer 42, a portion thereof is added to $E_D$ (numeral 64) to form $E_G$, designated by 68. As $E_G$ is formed, it is stored in unit 15 for the period P, at the end of which it is read out as $E_D$, designated by numeral 70, starting at time j4.

As $E_D$ is read out, it is again fed to 10S and added to $E_{osc}$ to further modify $V_O$ and to further reduce the deviation or disturbance in $V_L$.

By observing the various waveforms for the next few cycles, it should be apparent that as $V_L$ gets closer to $E_{osc}$, $E_X$ decreases in amplitude as seen from wave shapes 72 and 74. However, as long as $E_X$ is other than zero with the polarity as shown in FIG. 6b, both $E_G$ and $E_D$ increase in size, as seen from the wave shapes designated by numerals 76 and 78 and 80 and 82. As $E_D$ increases, so does the modification of $V_O$ until $V_L$ is substantially identical to $E_{osc}$, as assumed in the fifth cycle.

When $V_L$ is fully corrected with respect to $E_{osc}$, $E_X$ is zero, as designated by the straight line 85 in FIG. 6b during the fifth cycle. With $E_X$ essentially zero, $E_G$ is essentially equal to $E_D$, which is read out during the same cycle. Thus, in the particular example, during the fifth cycle $E_G$, designated by numeral 86 is identical to $E_D$.

It should be pointed out that since $E_G$ is stored in unit 15 for less than one full cycle by the period T, some over-compensation may occur, which would cause the error signal $E_X$ to appear again. However, it would appear with a polarity opposite to that shown in FIGS. 5a and 5b. Consequently, $E_G$ and $E_D$ would decrease to reduce the the correction of $V_O$, and thus maintain $V_L$ to be substantially identical in waveform and time with respect to $E_{osc}$. Alternately stated, due to the storing of $E_G$ by a period of T less than one full cycle, some hunting occurs, with $E_X$ exhibiting opposite polarities during successive cycles so as to maintain the desired correction at the point where the disturbance occurs.

From the foregoing, it should thus be amply clear that, in the present invention, the correction of $V_L$, i.e. the load voltage, takes place at the point in the cycle where the disturbance actually occurs, rather than attempting to correct a localized disturbance by simply varying the amplitude of the entire cycle.

Although a particular embodiment of the invention has been described and illustrated herein, it is recognized that modifications and variations may readily occur to those skilled in the art. Consequently, it is intended that the claims be interpreted to claim all such modifications and equivalents falling within the scope of the invention.

What we claim is:

1. In a system wherein a power source provides a cyclic voltage of a preselected waveform, definable as $V_O$, to a remotely located load through a distribution network, the voltage across the load being definable as $V_L$ and wherein said distribution network causes distortion in $V_L$, an arrangement comprising:
   first means for comparing the waveform of $V_L$ with a waveform in said power source for generating an error signal representing any deviation between the waveform of $V_L$ and said waveform in said power source;
   second means for storing said error signal for a time period definable as P which is less than one full cycle by a time period T; and
   third means in said power source responsive to the stored error signal after the period P and to the waveform in said power source for generating $V_O$ with a modified waveform to compensate for the distortion in $V_L$.

2. An arrangement as recited in claim 1 wherein said power source includes an oscillator for providing the voltage waveform of said preselected waveform and wherein said first means for comparing compares the waveforms of the voltage from said oscillator and $V_L$ to generate the error signal and wherein said third means includes summing means for summing at least a portion of said stored error signal with said error signal and amplifier means to amplify the combination of said oscillator voltage waveform and said stored error signal to provide said $V_O$ with said modified waveform.

3. An arrangement as recited in claim 2 wherein T is less than the time $V_L$ is delayed at said load with respect to $V_O$.

4. An arrangement as recited in claim 3 wherein T is less than one-fourth the time $V_L$ is delayed at said load with respect to $V_O$.

5. In a circuit combination which includes a power source with an oscillator which provides a cyclic voltage of a preselected waveform, amplifier means for amplifying the oscillator voltage to provide a power source output voltage $V_O$ of the same waveform as the oscillator voltage to a remotely located load connected to said power source through a distribution system, the voltage across the load, definable as $V_L$, being subject to waveform distortion due to at least the load and the distribution network, an arrangement for substantially reducing the distortion of the waveform of $V_L$, the arrangement comprising:
   first means for comparing the ocsillator voltage with $V_L$ and for providing an error signal representing the difference therebetween;
   means for delaying said error signal for a period of time, definable as P which is less by a time period T than one full cycle of the voltage from said oscillator;
   summing means responsive to the error signal and to at least a portion of the delayed error signal for generating a modified error signal with a waveform which differs from that of the error signal as a function of the portion of the delayed error signal supplied to said summing means; and
   means for feeding said delayed error signal to said amplifier means to form $V_O$ with a modified waveform, whereby when the voltage $V_L$ is present at the load the waveform thereof is substantially the same as that of the oscillator output voltage.

6. An arrangement as recited in claim 5 wherein $V_L$ is effectively delayed by a period Z with respect to the oscillator output voltage, T being less than Z.

7. An arrangement as recited in claim 6 wherein T is not more than one-fifth of Z.

8. An arrangement as recited in claim 5 wherein the waveform of the oscillator is sinusoidal.

9. An arrangement as recited in claim 8 wherein $V_L$ is effectively delayed by a period Z with respect to the oscillator output voltage, T being less than Z.

10. An arrangement as recited in claim 9 wherein T is not more than one-fifth of Z.

11. A method of compensating an output voltage waveform, of a power source having a source voltage waveform, in which the output voltage waveform is supplied through a distribution system to a load and wherein said distribution system causes distortion in the voltage waveform across said load comprising the steps of:
comparing the voltage waveform across said load with said source voltage waveform for generating an error signal representing deviation between the voltage across said load and the source voltage waveform;
storing said error signal for a time period definable as P which is less than one full cycle of the source voltage waveform by a time period T; and
generating a modified output voltage waveform in response to the stored error signal to compensate for the distortion in the voltage waveform across said load.

* * * * *

UNITED STATES PATENT AND TRADEMARK OFFICE
CERTIFICATE OF CORRECTION

PATENT NO. : 5,142,216

DATED : August 25, 1992

INVENTOR(S) : Fausto V. Taddeo and Mark A. Woodward

It is certified that error appears in the above-identified patent and that said Letters Patent is hereby corrected as shown below:

Column 2, line 64, "created by the," should read --created by the--.

Column 3, line 43, "ED" should read --$E_D$--.

Column 5, line 3, "unit 15" should read --unit 45--.

In the Abstract, line 2, "$V_2$" should read --$V_L$--.

Signed and Sealed this

Twenty-fourth Day of October, 1995

*Attest:*

BRUCE LEHMAN

*Attesting Officer*     *Commissioner of Patents and Trademarks*